United States Patent [19]

Mitchell et al.

[11] Patent Number: 4,798,223
[45] Date of Patent: Jan. 17, 1989

[54] DOUBLE BLOCK AND VENT VALVE SYSTEM

[75] Inventors: Richard A. Mitchell; Joseph R. Buchanan, both of Portland, Conn.

[73] Assignee: Skotch, Inc., Portland, Conn.

[21] Appl. No.: 118,602

[22] Filed: Nov. 9, 1987

[51] Int. Cl.⁴ ............................................. F16K 1/44
[52] U.S. Cl. ................................. 137/312; 137/554; 137/627.5; 137/630.22
[58] Field of Search ............... 137/312, 554, 627.5, 137/630.19, 630.22

[56] References Cited

U.S. PATENT DOCUMENTS

| | | |
|---|---|---|
| Re. 31,845 | 3/1985 | Peters . |
| 1,834,596 | 12/1931 | Clapp . |
| 2,751,183 | 6/1956 | Crookston . |
| 2,896,903 | 7/1959 | Canalizo . |
| 3,294,120 | 12/1966 | Ruchser . |
| 3,472,480 | 10/1969 | Wiliams . |
| 3,590,839 | 7/1971 | Moore . |
| 4,074,688 | 2/1978 | Snyder . |
| 4,080,946 | 3/1978 | Cunningham . |
| 4,145,025 | 3/1979 | Bergeron . |
| 4,146,056 | 3/1979 | Buchanan . |
| 4,234,015 | 11/1980 | Kintner . |
| 4,304,251 | 12/1981 | Schadel ............... 137/312 X |
| 4,326,558 | 4/1982 | Gage . |
| 4,356,833 | 11/1982 | Mayfield, Jr. et al. . |
| 4,436,106 | 3/1984 | Tuchenhagen ......... 137/312 X |
| 4,554,947 | 11/1985 | Cobb, III . |
| 4,585,207 | 4/1986 | Shelton . |
| 4,655,253 | 4/1987 | Ourensma ............. 137/312 X |
| 4,687,015 | 8/1987 | Mieth ................... 137/312 X |

FOREIGN PATENT DOCUMENTS 2531019  1/1977  Fed. Rep. of Germany ...... 137/312

Primary Examiner—Robert G. Nilson
Attorney, Agent, or Firm—McCormick, Paulding & Huber

[57] ABSTRACT

A valve assembly for use in the passage of fluid in a conduit system wherein the valve assembly possesses an actuator part and a valve part for controlling the flow of fluid therein while simultaneously providing means for purging any residual fluid trapped within the valve assembly when the valve is in its closed position. The valve part of the valve assembly is made up of a cage means housing two flow-to-close valve members which are independently spring biased in the closed position. Placed within this cage member are venting means which provide a passage for trapped gases to escape through a vent duct system when the valve is in its closed position, but restricting the vent means when the valve is in its full open position.

15 Claims, 4 Drawing Sheets

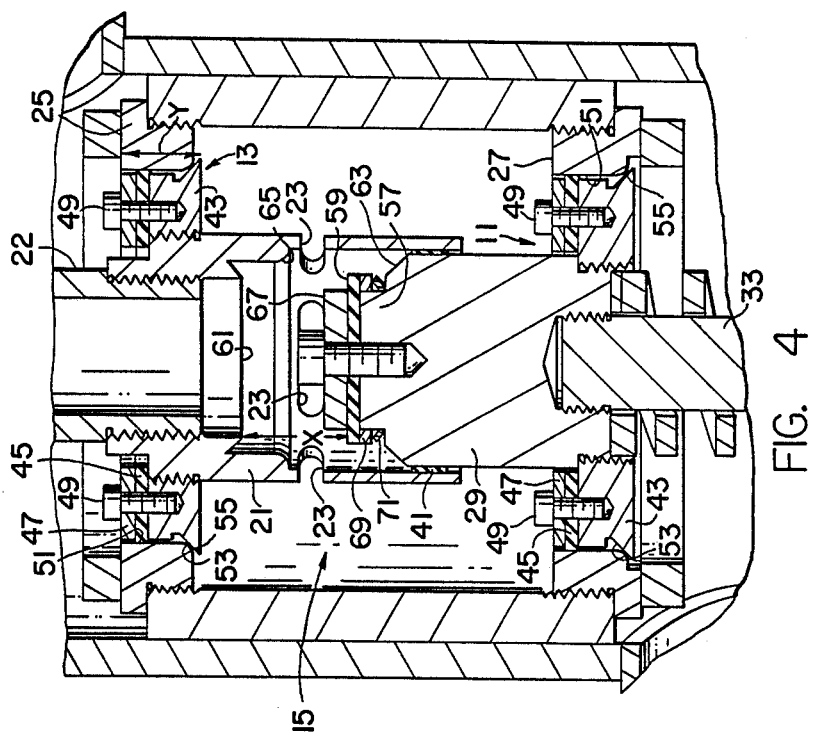

4,798,223

DOUBLE BLOCK AND VENT VALVE SYSTEM

BACKGROUND OF THE INVENTION

In the handling of volatile fluids, toxic and/or flammable gases, in a conduit flow system, safety standards require that valves which control the flow of material through the conduit system possess safety redundancies for insuring control as well as requiring vent means for gases which have been trapped by the valve structure which controls flow. It has been a conventional practice to provide two separate valves in series between the intake and outlet. Residue material between the trapped closed valves presented an undesirable and unsafe condition in the system because leakage of such material into the surrounding work environment could be hazardous. Thus, it was further required by safety standards to tap the conduit between the two serial valves to provide a leaching conduit to vent residual material for dispersal into the atmosphere. In this leaching conduit was yet another valve independently operated from the two serial valves which controlled the opening and closing of the vent system.

In gas burner systems a valve arrangement of this type is known as a "double block and vent system". Several drawbacks were found to exist with the foregoing valve system due to inherent deficiencies of the separate valve elements to cooperatively interact with each other in providing a safe and efficient means of controlling fluid flow. One such problem exists with the control of the serial valves. Where each serial valve is independently operated, the user is faced with a requirement for three separate actuator means to control a simple on/off function. In many instances, the system might inadvertently leach pressurized fluid from the incoming source due to the imprecision in the sequencing of the valves. Further, sequencing of valves is complicated by industry safety standards which may require that individual valves themselves possess redundancy in the seating means. Moreover, it is desirable that the seating means be sequenced to seat and unseat in a specific staggered manner. Hence, the problem of efficiently controlling the precise movements can become extremely complicated when one is utilizing three separate valves and actuators to accomplish a single on/off function.

SUMMARY OF THE INVENTION

It is the general object of the present invention to provide a single valve assembly having only one actuator means sequentially activating two valve plug assemblies and a vent means to operatively control the flow of fluid through a conduit system in a more efficient and economic manner.

It is yet another object of the present invention to provide a single valve assembly which vents only the residual gas trapped between the two valve plug assemblies and selectively vents any residual gas remaining in the outlet conduit.

A further object of the invention is to provide within the valve assembly serially oriented valve plugs, each valve plug being independently spring biased in a flow-to-close orientation.

A still further object of the present invention is to provide dual integrity for each of the valve plug seats utilized in the assembly by providing a metal-to-metal contact as well as a resilient seal means at each closure surface.

BRIEF DESCRIPTION OF THE DRAWINGS

FIG. 4 shows in vertical section an enlarged view of a cage assembly housing the double valve plug and vent mechanism used in the present invention.

DESCRIPTION OF THE PREFERRED EMBODIMENTS

Figure 1:
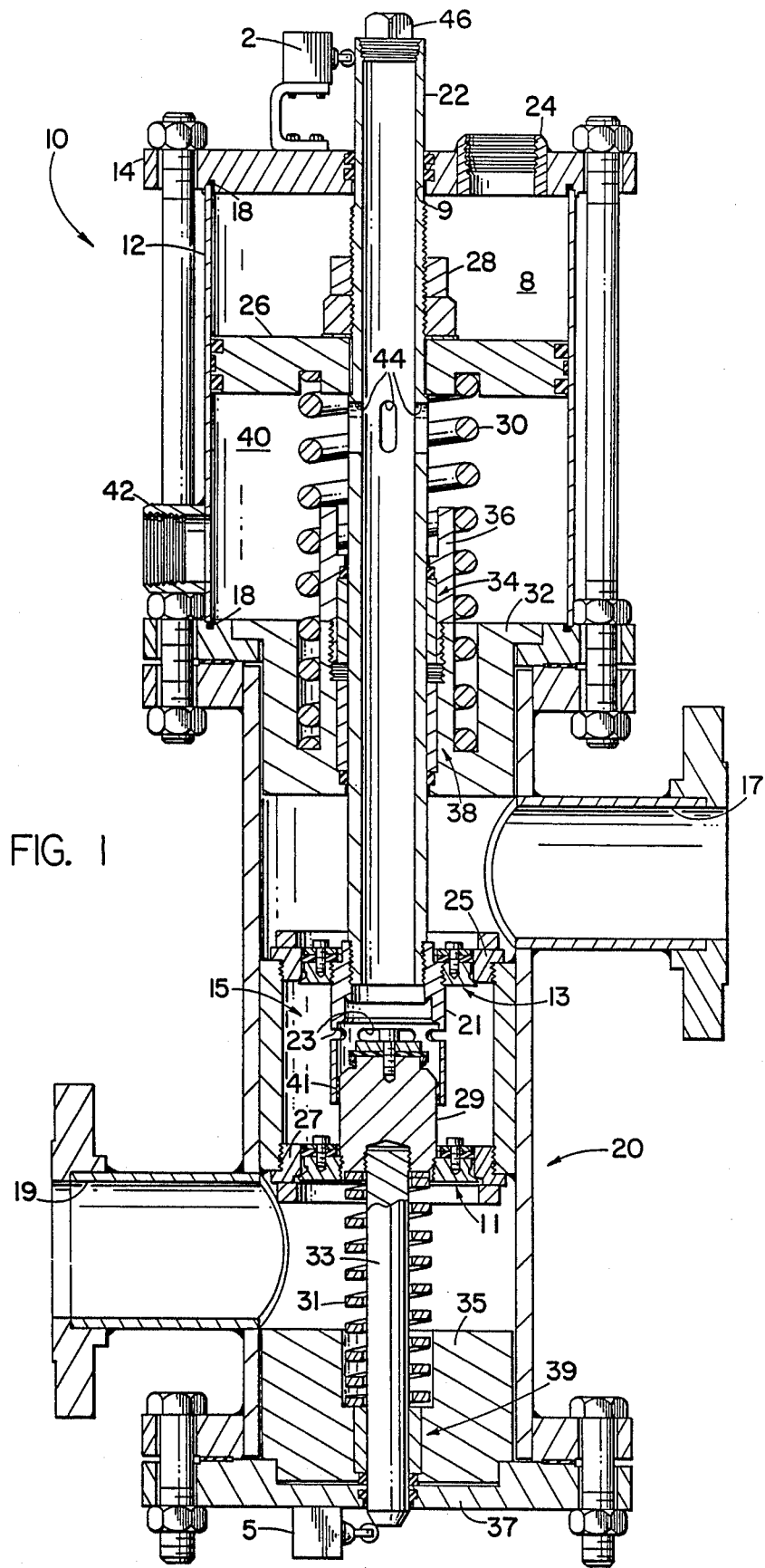
FIG. 1 is a vertical section through the valve of the present invention and through an illustrative actuator used in conjunction therewith, depicted with the valve assembly in its closed, no flow condition.
Figure 2:
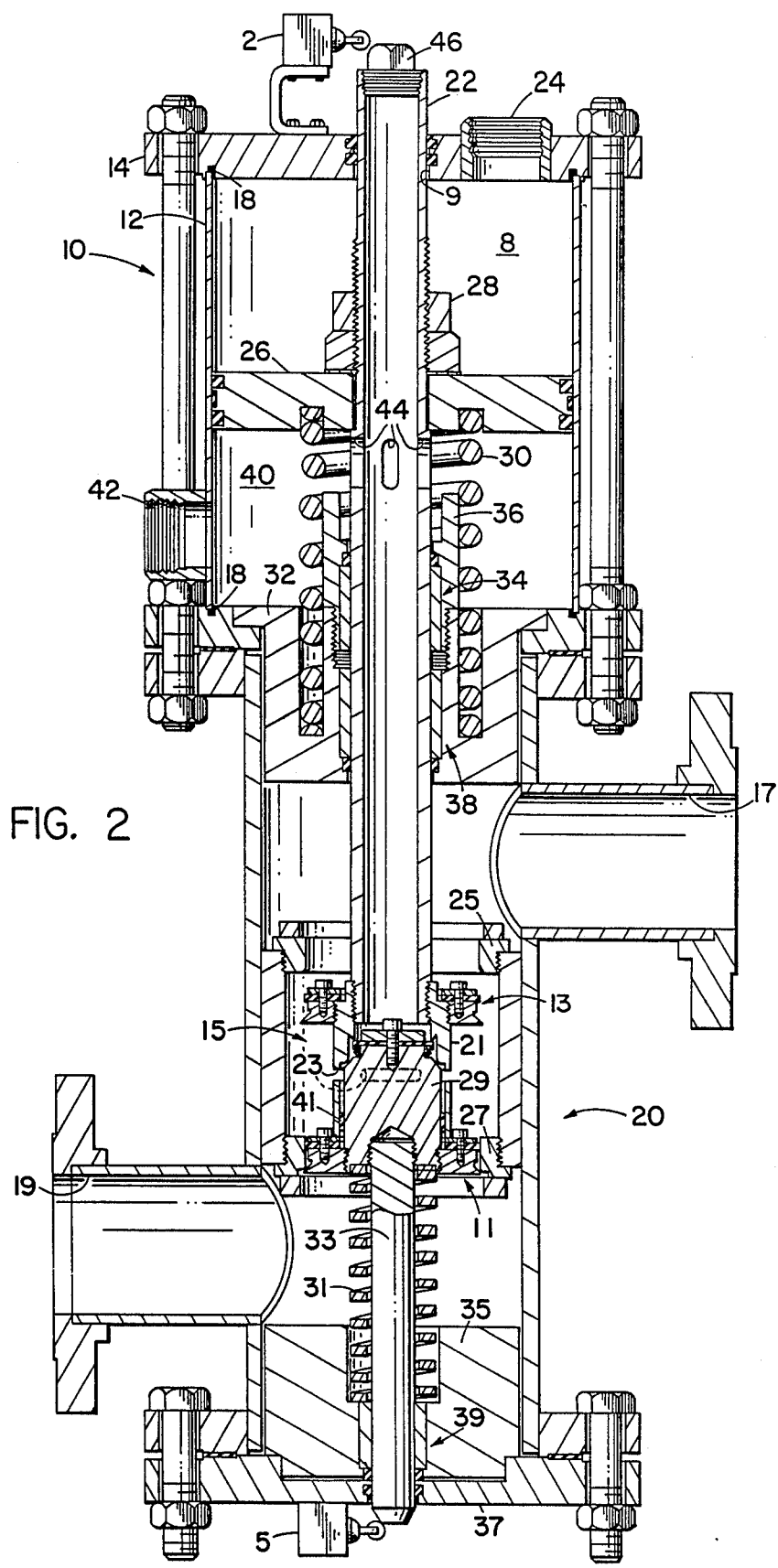
FIG. 2 is a drawing in vertical section showing the valve assembly of the present invention at an intermediate stage between full open and full closed positions.
Figure 3:
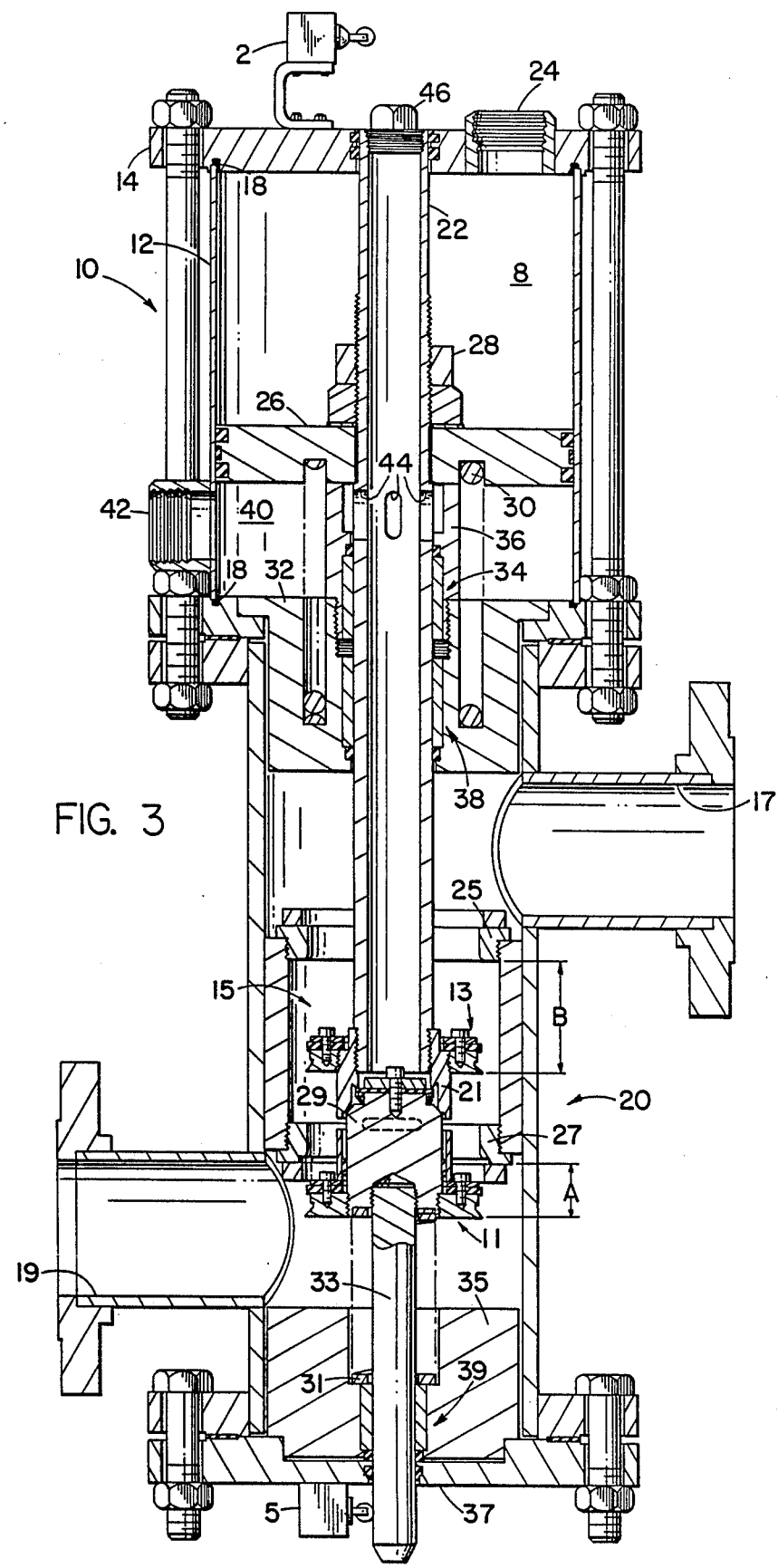
FIG. 3 shows the valve assembly of the present invention in vertical section as it is positioned in the fully open flow through position.

Referring generally to FIGS. 1-3 it will be observed that the valve assembly of the present invention comprises an actuator and vent apparatus generally illustrated at 10 and a valve structure generally illustrated at 20. These two parts are connected by commonly known means such as flange and bolt connections and are depicted as being so connected in the drawings for illustration purposes only. The actuator and vent assembly 10 is defined by a cylindrical member 12 whose ends are received within annular grooves on end plates 14 and 16. Housed within these grooves and in coaction with the end of the cylindrical member are annular seal members 18 which provide for airtight connection therebetween. Slidingly received within the through bore 9, is a shaft member 22 which serves as a piston rod member. Shaft member 22 is a hollow member and serves another purpose which will become evident as the operation of the mechanism is discussed.

One such purpose of shaft member 22 is to provide to the valve part 20 of the assembly, movement which enables the opening and closing of the valve conduit as is defined by inlet and outlet ducts 19, 17 and cage member 15. Piston 26 is attached to shaft 22, and both the piston 26 and the shaft 22 are displaced in an axially movable manner. Locking bolt members 28 clamp the piston 26 against an abuttment face formed on the shaft 22. Spring member 30 acts to axially bias the piston and shaft assembly in an upward manner. Thus, it should be appreciated that upon initial assembly of the apparatus, a predetermined spring load can be accomplished by the assembler by threading the lock bolts 28 on the threaded portion of shaft 22 until piston 26 engages the aforementioned abutment face.

As previously mentioned, shaft 22 being a hollow member, serves another purpose in providing a vent conduit for the lower valve assembly 20 as well as providing the actuating means for the opening and closing motion thereof. Since the shaft 22 does reciprocate in an axial fashion, collar member 36 which is supportively mounted with the boss 32, provides for a bushing member and a seal means generally designated at 34 to allow for relative movement between the shaft 22 and the boss 32 in a slidable, sealable manner. Likewise, boss 32 also contains bushing and seal means generally indicated at 38 to provide a redundancy to the shaft sealing system. Thus, the seal and bushing means 34, 38 in cooperation with those similar seal and bushing means located on the outer periphery of piston 26 cooperate with the cylinder 12 to define a sealed chamber 40. The chamber 40 is provided with a vent orifice 42 to permit the leaching of residual gases to the atmosphere. Shaft ducts 44 communicate the residual gases which exist in the valve structure 20 into chamber 40 and out the vent orifice 42. These ducts 44, when taken cumulatively, possess a passage area sufficient to allow venting of gases as required by code. Therefore, it should be appreciated that the upper actuator and vent assembly 10, not only possesses control means by which the valve structure 20 is opened and closed, but also unitarily possesses means by which residual gas, trapped within the valve conduit, can be vented into appropriate disposal means.

The valve structure generally designated as numeral 20, is comprised of a cage member designated as 15 having an upper plug assembly member 13 and a lower plug assembly 11. Upper valve plug assembly member 13 is fixedly attached to the lower depending end of the shaft 22 through the intermediate receiver element 21 using commonly known attachment means such as threads. As was previously discussed, spring 30 compressively abuts against piston 26 and boss member 32 to axially bias shaft 22 in an outwardly disposed manner. This axially outward movement is therefore limited by contact abuttment of the upper valve plug assembly member 13 with the annular shoulder member 25. Likewise, lower valve plug assembly member 11 is fixedly attached with plunger member 29 in a known manner such as by threading. The support shaft 33 is slidably received within an aperture made in the end flange 37 and is further journalled within a lower boss member 35 having seal and bushing means 39 similar to those found at 34 and 38. The opposite end of support shaft 33 is fixedly attached with plunger member 29 or, alternatively, the entire plunger shaft assembly may be cast as a unitary piece. Spring member 31 is interposed between plunger 29 and the support surface of lower base member 35 and coaxially surrounds shaft 33 to thereby seat the lower valve plug member 11 against the annular shoulder member 27. Annular shoulder members 25 and 27 are illustrated as separate threaded devices but could, in fact, be formed integrally with the inner diameter of the cage portion to provide the same type of abuttment surface. Thus, it should be appreciated from the foregoing that the upper and lower valve plug assembly members 13 and 11, respectively, are individually biased in their closed position by separate spring members which insure safer integrity of the valve structure, as a whole, by introducing separate redundancies thereto and conforming as well to industrial code specifications.

Turning now to the general arrangement of valve structure 20 as illustrated in FIGS. 1–3, it should be observed that duct 19 is the inlet orifice while duct 17 is the outlet orifice and the cage 15, which is responsible for the control of flow through the valve conduit, is oriented between these two duct members. Spring member 31 is shown as compressing the lower plug member 11 upwardly into engagement with the annular shoulder member 27 while the spring member 30 effectively draws the upper plug member 13 into engagement with its annular shoulder member 25. Such a feature is important to the operation of the total assembly because both valve plug assembly members 13 and 11 are biased in their flow-to-close position. That is, when fluid is introduced into duct 19 the fluid pressure acting upon the outer face of valve plug assembly member 11 acts in conjunction with the spring force of member 31, to thereby seat the valve with the pressure of the flow.

Likewise, valve plug assembly member 13 is arranged within the valve structure 20 as a flow-to-close valve in that spring member 30 acts to seat valve plug 13 in the direction of flow and therefore the valve seal is further maintained by the combination of forces between flow pressure and the related spring members.

It should be further appreciated that the arrangement of valve plug members 11 and 13 as set forth by the present invention provides for two serially oriented valve plugs which are located, respectively, upstream and downstream of the fluid flow and are each independently biased in a closed position by individual spring means to so insure a dual factor of safety to the valve system. Thus, the NFPA standard for safe operation of gas fired burner and boiler furnaces is met due to the particular orientation of these valve plug members in that two, flow-to-close valves are provided in an upstream and downstream orientation relative to the direction of fluid flow.

As shown in FIG. 1 where the valve assembly is depicted in its closed position, the receiver member 21 telescopically overlays the plunger member 29. The receiver member 21 slides relative to plunger member 29 on a bushing member 41 which provides a slidable bearing surface therebetween. Bushing member 41 can be formed from any number of suitable materials such as TEFLON or the like. Thus, the lower end of the receiver member 21 is slidable on the plunger 29 and therefore controls the on and off positioning of the vent ducts 23 placed on the receiver surface and provides a vent passage between the cage structure 15 and the vent outlet duct 42. It should be noted that the cumulative areas of slots 23 equal a total passage area satisfying code specification for a properly sized ventilation opening.

Referring now to FIG. 4 which is an enlarged view of the cage mechanism and illustrates in detail the cooperation between valve plug assembly members 13 and 11 in conjunction with the receiver and plunger members 21 and 29. Each of the valve plug assemblies 13 and 11 are similarly defined by a series of disk members labelled as 43, 45 and 47 which provide to each of the respective valve plugs a dual sealing means. Disk member 43 is a metal member which has on its outermost edge an angular face 53 which abuttingly contacts the rounded shoulder portion 55 of the annular shoulder members 25 and 27 to thereby provide a metal-to-metal seal as required by industrial standards. Also, each plug has a soft seal as shown at 45 in FIG. 4. The seal 45 is clamped by means of cooperation between the retaining ring 47 and disc member 43 by the clamping bolt 49. Furthermore, the inner diameters of the annular shoulder members 25 and 27 are slightly tapered in the direction of flow in order to promote an outer diameter interference fit between the extending radial surface of the seal or resilient member 45 and the tapered inner surface of the shoulder members for accomplishing a further sealing effect between the tapered surface 51 and resilient member 45.

As has been previously mentioned, plunger member 29 is slidably received within receiver member 21 and thereby limits the introduction of gases into shaft member 22 by passing the receiver member 21 over the plunger member 29 and thus engages the cooperative vent seal means located on the respective receiver and plunger members. Located at the free end of plunger 29 is a stepped portion 57 which mounts resilient disk 59 and a connecting intermediate angular face 63 which provides for a second sealing and force transmitting surface. The resilient disc 59 may be formed from elastic material such as rubber, or neoprene, or the like. Receiver member 21 is a hollow, barrel-shaped member having an inner surface formed to receive the plunger member in a sealing and force transmitting manner. Like the structure of the valve plug members 11 and 13, the plunger-receiver member seal means also comprise a metal-to-metal seal and a soft seal. As will be explained later, the engagement of this metal-to-metal contact contributes both to the sealing integrity of the vent valve while also serving to actuate the lower valve assembly 11 in an open and closed manner. Nevertheless, it should be appreciated that receiver member 21 has provided within its inner surface structure which cooperates with corresponding external structure on the plunger member 29 in order to form an airtight seal generated by the dual interaction of the metal-to-metal and the soft seal means.

Initial engagement between receiver member 21 and plunger member 29 occurs with the contact of the annular leading edge 61 of the receiver 21 and the radially outer extending portion of the sealing resilient disk 59. The sealing resilient disk 59 is clamped between a cap member 67 and a support shoulder formed on plunger 29 and is supportingly biased through the cooperation of the wave washer 71 and support washer 69. Initially, axial contact between the two telescoping members 29 and 21 occurs only between the leading edge member 61 and the sealing resilient disk 59. Since the radially extending annulus of the resilient disc 59 is flexible, it minutely stretches axially, against the bias of the wave washer 71, in response to the force generated by the movement of edge member 61. Once the wave washer 71 is compressed, the resilient disc 59 is no longer flexed because relative axial movement between the receiver member 21 and the plunger member 29 ceases. The placement of rounded annular shoulder member 65 with respect to the leading edge 61 is such that the axial bearing force of the shaft member 22 will not overly compress sealing disk 59 because the axial distance between the edge member 61 and the rounded shoulder member 65 is selected so that upon a selected compression of wave washer 71, rounded shoulder 65 contacts angular face 63 to thereby bear the axial force generated by shaft member 22. Thus, it becomes apparent that while all the valve plug assemblies involved in the present invention possess a dual factor of safety by providing both a metal-to-metal seal and a resilient soft seal means, the metal-to-metal seal of the vent assembly as generally defined by elements 21 and 29, serves also as a mechanical bridging interface for the transmission of force between the separate shaft members 22 and 33.

Referring now to the operation of the valve assembly and in particular FIG. 1, which is an embodiment depicting the closed position of the valve, it should be noted that in the closed position, the valve assembly is provided through the vent ducts 23 with a conduit by which any gases that have been trapped within cage 15 or which have been introduced into the cage through seepage, may be vented through shaft 22, to the vent orifice 42. Moreover, in this closed position, the lower valve plug assembly member 11 is not positively connected in an axially manner to shaft member 22 and therefore will not become axially engaged until the previously discussed metal-to-metal contact between receiver member 21 and plunger member 29 occurs. When, however, it is desirable to open the valve assembly in order to introduce fluid into the outlet duct 17 from the inlet duct 19, the operator energizes the actuator means by introducing pressurized fluid through duct 24 thus driving shaft 22 toward the valve assembly 20.

The initial movement of shaft member 22 axially displaces the valve plug assembly member 13 into the cage 15 thus opening the downstream plug first while insuring the upstream valve opens last. Reference is now made to the relative axial lengths existing between the dimension indicated as Y of the upper plug assembly and the dimension designated as X of the receiver plunger assembly 21, 29 as presented in FIG. 4. The dimension Y represents the length which the upper valve plug assembly member 13 must travel in order to provide a clearance between itself and the annular shoulder member 25. The dimension represented as X depicts the length of axial travel which is needed for the receiver member 21 to initially engage the sealing disk 59. As is clear from FIG. 4, receiver member 21 and upper plug member 13 are rigidly attached with the other and thus the lengths represented by X and Y represent lines of travel which occur simultaneously. Thus, because the length which is required for initial sealing engagement of the receiver member 21 with the vent sealing resilient disc 59 is greater than the length which is required for the upper plug member 13 to open through the outlet duct 17, there exists a period in the travel of shaft 22 where the outlet conduit 17 is vented through the openings 23 of the receiver member 21 due to the difference in relative axial lengths between the dimensions X and Y. As can be appreciated from FIG. 2, which shows the intermediate position of the valve member, the initial axial movement of shaft 22 only unseats the upper valve plug assembly 13 while this movement does not affect the closed position of the lower valve plug assembly 11 until the previously discussed contact between rounded annular shoulder member 65 and the angular face member 63 occurs.

Referring now to FIG. 3 which illustrates the full open position of the valve assembly, it should be appreciated that the interengagement of the contact faces 65 and 63 on the receiver member and the plunger member, respectively, has occurred and therefore the continued axial movement of the shaft member 22 biases the lower valve plug assembly against the closing force of spring member 31 to thereby open the upstream oriented valve plug assembly member 11 and permit fluid flow through the entire valve conduit assembly. As can be seen from FIG. 3, in the full open position, the valve assembly permits no venting of gases through the receiver vent ducts 23 because in the open position the valve assembly must act as a conduit and transport a given fluid through the inlet duct to the outlet duct. Since it is desirable to insure that the integrity of the vent seal between plunger member 29 and receiver member 21 is closed to seepage when the valve assembly is in the open position, plug member 46 may be detached from the shaft member 22 in order that a probe be introduced into the shaft to test for seepage of fluid between the juxtaposed receiver and plunger members.

Closing of the valve occurs in the reverse order of opening. Upon depressurization of the actuator chamber 8 the shaft member 22 begins to move away from the valve assembly 20 under the bias of the spring members 30 and 31. As shaft 22 moves back toward the actuator part 10, the lower valve plug assembly member 11 seats itself within annulus 27 to thereby create a first upstream stoppage. As shown in FIG. 3, distance B represents the length which the upper valve plug assembly 13 must travel in order to be oriented in its full open position while distance A represents the length which lower valve plug assembly 11 must travel in order to be oriented in its full open position. Since length B is greater than length A, it becomes apparent that upon movement of the shaft member 22 away from valve assembly 20, the lower valve plug assembly member 11 will seat before the upper valve plug assembly member 13 and that the upper valve plug assembly member 13 will continue to slide axially relative to the plunger 29 once the lower valve plug is seated for a distance which is equal to the difference between the dimensions A and B. During this period where the receiver member 21 is pulled away from the plunger member 29, the upper valve plug assembly member is open to the outlet duct 17 and there exists yet another opportunity for the venting of the outlet duct 17 to the outside vent orifice 42. Ultimately, when shaft member is fully retracted, as shown in FIG. 1, the upper valve plug assembly member 13 once again is seated within the annular shoulder member 25 and the vent means housed within the cage 15 is open to leach the cage 15 of any remaining gases trapped therein or to vent any seepage which is introduced within this cage.

Switch members 2 and 5 can be used to indicate to the operator the positioning of the valve plug assembly members 13 and 11 as well as to indicate to the operator the position of the vent duct valve system housed within the cage 15 by monitoring the axial displacement of shaft member 22 and support shaft member 33 relative to a fixed position.

From the foregoing it will be apparent that a valve of a relatively simple yet rugged construction has been provided. A desirably simple yet mechanically efficient assembly is utilized to achieve a safe and reliable valve which purges the unwanted residual gases remaining in the assembly after closure of the upstream valve gate assembly member is effected. It should be understood that numerous modifications and substitutions can be made to the present invention without departing from the spirit thereof. For example the actuator means need not be a fluid pressurized mechanism but rather an electrically operated linear motor or the like.

We claim:

1. A unitary valve assembly for use in the passage sage of fluids which may include volatile, flammable or poisonous gases, said valve assembly comprising:

a valve structure having an inlet duct and an outlet duct which controls the flow of fluid therein an actuator structure connected with said valve structure for generating motion to said valve structure, said valve structure including cage means interposed between said inlet and said outlet ducts, said cage having first and second annular shoulder members, vent means operative within said cage means for purging residual gases remaining within said cage means and said outlet duct member, shaft means operatively connecting said actuator structure with said valve structure, said vent means being integral with said shaft means and said shaft means including first and second shaft members, each of said first and second shaft members being biased by separate biasing means, said first shaft member being connected with first valve plug assembly means and said second shaft member being connected with second valve plug assembly means, each of said separate biasing means cooperative with said first and second shaft members and respectively biasing said first and said second valve plug assembly means into a closed sealing engagement with said respective first and said second annular shoulder members, said first shaft member and said second shaft member being mechanically bridged by a receiver member outwardly extending from one end of said first shaft member and telescopically receiving an outwardly extending plunger member formed on one end of said second shaft member.

2. a valve assembly as set forth in claim 1 wherein said actuator structure further comprises a movable actuator assembly being operatively connected with said first shaft member, said first shaft member through movement by said actuator assembly imparting said motion to said valve structure for controlling the flow of fluid therein.

3. A valve assembly s set forth in claim 2, wherein said receiver member and said first valve plug assembly means are unitarily connected, and said first shaft member is connected to said first valve plug assembly means through said receiver member, said plunger member and said second valve plug assembly means are unitarily connected and said second shaft member is connected to said second valve plug assembly means through said plunger member, and said receiver member slidably travels telescopically over said plunger member.

4. A valve assembly as set forth in claim 3, wherein said receiver member and said plunger member possess corresponding contact surfaces for transmitting said motion from said first shaft member to said second shaft member.

5. A valve assembly as set forth in claim 4, wherein said first shaft member is a hollow member and comprises first and second vent means, said first vent means being cooperative with said actuator structure and said second vent means being cooperative with said receiver member, said actuator structure further comprising a vent orifice which provides a passage for gases remaining in the cage or the outlet duct to be vented through said second vent means, said hollow first shaft member, said first vent means and out said vent orifice.

6. A valve assembly as set forth in claim 5, wherein said first and second vent means include slots formed, respectively, in said first shaft member and in said receiver member, cumulative areas of the slots formed on each of said first shaft member and said receiver member equal, respectively the requisite area for proper venting of residue gases therethrough.

7. A valve assembly as set forth in claim 6, wherein said second vent means cooperates with seal means mounted on an axially extending shoulder portion of said plunger member to thereby coact against an annular axially extending edge member formed within said receiver member to thereby seal said second vent means when said edge member engages said seal means.

8. A valve assembly as set forth in claim 7, wherein said seal means mounted on said plunger member includes soft seal means which are axially biased outwardly in its normal free position, said annular axially extending edge member located on said receiver member being engageable with said soft seal means to axially inwardly compress the same against said axially outward bias before motion transmitting contact between said corresponding contact surface occurs.

9. A valve assembly as set forth in claim 8, wherein said second vent means and said first and second valve plug assembly means comprise both metal-to-metal seals and soft seal means, wherein said corresponding contact surfaces of said receiver and said plunger members defines the metal-to-metal seal of said second vent means, and wherein said first and second annular shoulder members respectively contacting said first and second valve plug assembly means defines the metal-to-metal seal in said first and second valve plug assembly means.

10. A valve assembly as set forth in claim 9, wherein said first and second valve plug assembly means each further comprise a resilient annular ring member disposed circumferentially thereon, each of said resilient annular ring members being received within tapered passages formed in said first and second annular shoulder members to thereby form the soft seal means of said first and second valve plug assembly means.

11. A valve assembly as set forth in claim 10, wherein the axial distance which is required for said seal means of said second vent means to engage said annular axially extending edge member is less than the axial distance which is required for the engagement of said corresponding contact surfaces to thereby permit ventilation of said cage means and said outlet duct through said first and second vent means.

12. A valve assembly as set forth in claim 9, wherein said first and second annular shoulder members are spaced apart at a given distance from one another and said slidable travel of said receiver member on said plunger member is limited by said engagement of said corresponding contact surfaces to a distance less than said given distance between said first and second annular shoulders members such that in the full open position of said valve assembly said first valve plug assembly means is displaceable an axially greater distance than said second valve plug assembly means allowing said first valve plug assembly means to initially be opened by initial movement of said first shaft member while said second valve plug assembly means initially remains closed until said engagement between said corresponding contact surfaces occurs, and retraction of said first shaft member by deactivating said movable actuator assembly axially displaces said first and said second valve plug assembly means equidistantly until said second valve plug assembly means seats within said second annular shoulder member and said first valve plug assembly continues to be axially displaced by the retraction movement of said first shaft member until engagement of said first valve plug assembly means with said first annular shoulder member occurs.

13. A valve assembly as set forth in claim 4, wherein said first and said second valve plug assemblies are positioned in a flow-to-close orientation with respect to the passage of a fluid.

14. A valve assembly as set forth in claim 2, wherein said movable actuator assembly comprises pneumatic piston means attached within said actuator structure to said first shaft member and said biasing means are spring members.

15. A valve assembly as set forth in claim 1, wherein the other end of said first shaft member extends outside of said actuator structure and contacts a first switch means, and the other end of said second shaft member extends outside of said valve structure and contacts a second switch means, said extended end portions of said first shaft member and said second shaft member respectively contacting said first switch means and said second switch means to activate said first and second switch means in order to indicate the position of said valve plug assembly means to an observer.

* * * * *